(12) United States Patent
Nakamura et al.

(10) Patent No.: US 9,385,643 B2
(45) Date of Patent: Jul. 5, 2016

(54) MOTOR DRIVE APPARATUS AND DISCHARGE CONTROL METHOD OF THE SAME

(71) Applicant: MITSUBISHI HEAVY INDUSTRIES AUTOMOTIVE THERMAL SYSTEMS CO., LTD., Kiyosu-shi, Aichi (JP)

(72) Inventors: Hideo Nakamura, Tokyo (JP); Naoki Nishikawa, Tokyo (JP); Masahiko Asai, Kiyosu (JP); Hiroyuki Kamitani, Kiyosu (JP)

(73) Assignee: MITSUBISHI HEAVY INDUSTRIES AUTOMOTIVE THERMAL SYSTEMS CO., LTD., Aichi (JP)

( * ) Notice: Subject to any disclaimer, the term of this patent is extended or adjusted under 35 U.S.C. 154(b) by 0 days.

(21) Appl. No.: 14/430,143

(22) PCT Filed: Oct. 16, 2013

(86) PCT No.: PCT/JP2013/078036
§ 371 (c)(1),
(2) Date: Mar. 20, 2015

(87) PCT Pub. No.: WO2014/061691
PCT Pub. Date: Apr. 24, 2014

(65) Prior Publication Data
US 2015/0249411 A1  Sep. 3, 2015

(30) Foreign Application Priority Data

Oct. 19, 2012 (JP) ................................ 2012-232062
Mar. 27, 2013 (JP) ................................ 2013-066484

(51) Int. Cl.
*H02P 6/06* (2006.01)
*H02P 6/24* (2006.01)
*H02P 6/18* (2016.01)

(52) U.S. Cl.
CPC .. *H02P 6/24* (2013.01); *H02P 6/18* (2013.01); *H02P 6/186* (2013.01)

(58) Field of Classification Search
CPC .............. H02P 6/24; H02P 6/18; H02P 6/186
USPC ....................................... 318/400.3
See application file for complete search history.

(56) References Cited

FOREIGN PATENT DOCUMENTS

| JP | 9-70196 A | 3/1997 |
| JP | 2001-136779 A | 5/2001 |
| JP | 2003-164190 A | 6/2003 |

OTHER PUBLICATIONS

International Search Report issued Dec. 3, 2013 for International Patent Application No. PCT/JP2013/078036 with an English Translation.
Written Opinion issued Dec. 3, 2013 for International Application No. PCT/JP2013/078036 with an English translation.

*Primary Examiner* — Erick Glass
(74) *Attorney, Agent, or Firm* — Birch, Stewart, Kolasch & Birch, LLP

(57) ABSTRACT

An object is to perform discharge of a capacitor using a motor without rotating the motor even when connected to a position sensorless motor. The motor drive apparatus calculates a voltage pulse width at which a motor does not rotate or vibrate using a both-end voltage of a smoothing capacitor and an inductance estimation value of the motor, and applies a voltage with the voltage pulse width to the motor to calculate an inductance. Then, a rotor position is estimated using the inductances calculated for individual switching patterns. A motor current is caused to flow on the basis of the estimated rotor position to perform discharge of charge accumulated in the smoothing capacitor.

10 Claims, 6 Drawing Sheets

|  | FIRST SWITCHING PATTERN | SECOND SWITCHING PATTERN | THIRD SWITCHING PATTERN |
|---|---|---|---|
| S1u | ON | OFF | OFF |
| S1v | OFF | ON | OFF |
| S1w | OFF | OFF | ON |
| S2u | OFF | ON | ON |
| S2v | ON | OFF | ON |
| S2w | ON | ON | OFF |

MOTOR DRIVE APPARATUS AND DISCHARGE CONTROL METHOD OF THE SAME

TECHNICAL FIELD

The present invention relates to a motor drive apparatus and a discharge control method of the same.

BACKGROUND ART

Conventionally, a motor drive apparatus is known which converts DC power supplied from a battery into three-phase AC power with an inverter, supplies the three-phase AC power to a motor, and thereby, drives the motor.

In such a motor drive apparatus, a smoothing capacitor for smoothing a DC voltage is provided on an input side of the inverter. Generally, at the time of stopping operation of the motor, the connection between the battery and the capacitor is shut in order to suppress power consumption of the battery. Nevertheless, since the capacitor is in the state where charge is accumulated in this stage, it is needed to discharge the charge quickly.

As one way of discharging the charge in the capacitor, for example, it can be considered that a discharge resistor is connected to both ends of the capacitor. However, it is not preferable that the discharge resistor is disposed, which causes the apparatus to be large.

A method of the discharge by causing the charge in the capacitor to flow in the motor is also proposed. For example, PTL 1 discloses a method in which a magnetic pole position of a rotor is detected, a torque current component Iq is configured to be zero, a magnetization current component Id is set to be a predetermined value, and thereby, the energy accumulated in the capacitor is caused to be consumed with windings of the motor without rotating the motor.

CITATION LIST

Patent Literature

{PTL 1} Japanese Unexamined Patent Application, Publication No. Hei9-70196

SUMMARY OF INVENTION

Technical Problem

However, in the discharge method disclosed in PTL 1, to detect the magnetic pole position is needed. Therefore, this method cannot be applied to a position sensorless motor which does not have a position sensor, for example.

The present invention is devised in view of the above-mentioned circumstances and an object thereof is to provide a motor drive apparatus and a discharge control method of the same by which discharge of a capacitor using a motor can be performed without rotating the motor even when connected to a position sensorless motor.

Solution to Problem

There is provided a motor drive apparatus according to a first aspect of the present invention, including: an inverter that converts DC power into three-phase AC power to be supplied to a motor; a capacitor provided on an input side of the inverter; and a control apparatus that controls the inverter, wherein the control apparatus includes a rotor position estimation unit that estimates a rotor position of the motor after operation of the motor is stopped, and a discharge control unit that discharges charge accumulated in the capacitor on the basis of the estimated rotor position, and the rotor position estimation unit includes a pulse width calculation unit that calculates a voltage pulse width at which the motor does not rotate or vibrate using a measurement value of a both-end voltage of the capacitor and an inductance estimation value of the motor, for each of three preset switching patterns, an inductance calculation unit that applies a voltage with the voltage pulse width calculated by the pulse width calculation unit to calculate an inductance, for each of the switching patterns, and a position estimation unit that estimates the rotor position using the inductances for the respective switching patterns calculated by the inductance calculation unit.

According to the above-mentioned motor drive apparatus, a pulse voltage width at which the motor does not rotate or vibrate is beforehand obtained by operations, the motor current and the capacitor both-end voltage at the time of applying the voltage with this pulse voltage width are detected, and the inductances of the windings are calculated on the basis of this detection value to estimate the rotor position. By doing so, the rotor position can be estimated without rotating or vibrating the motor. Accordingly, after the rotor position is detected, the current only has to be caused to flow with respect to the winding position where the rotor hardly rotates. The charge accumulated in the smoothing capacitor can be discharged without rotating or vibrating the motor.

In the above-mentioned motor drive apparatus, the pulse width calculation unit repeatedly may calculate the voltage pulse width until the motor current at the time of applying the voltage with the pulse width which is determined falls within a preset proper range, for each of the switching patterns, and the inductance calculation unit may calculate the inductance using the measurement value of the both-end voltage of the capacitor and a measurement value of the motor current at the time when the motor current falls within the proper range.

In this way, the operations of the voltage pulse width are repeatedly performed until the motor current falls within the proper range. Hence, the rotor position estimation can be performed without rotating or vibrating the motor.

In a motor control apparatus mentioned above, a discharge control unit that is mentioned above is preferable to cause the motor current to flow in one direction by switching a switching element determined on the basis of the rotor position estimated by the position estimation unit at a predetermined switching frequency, and the predetermined switching frequency is preferable to be configured within a range not less than a frequency in an audible range and not more than twice a minimum frequency in the audible range.

In this way, by performing the switching such that the motor current is caused to flow in one direction, noise can be reduced.

In the above-mentioned motor drive apparatus, the rotor position estimation unit may not perform rotor position estimation, regarding a case as detection of abnormality, in the case where the motor current is zero or the motor current exceeds a first upper limit value determined on the basis of a maximum allowable current at which the motor does not rotate or vibrate for any of the switching patterns.

According to such a motor drive apparatus, the rotor position estimation is promptly stopped when the abnormality is detected. Hence, an event that the motor is caused to rotate, for example, by an abnormal current allowed to flow in the motor can be prevented.

In the above-mentioned motor drive apparatus, rotor position estimation may not be performed, regarding a case as detection of abnormality, in the case where the inductance calculated by the inductance calculation unit is out of a preset allowable range.

According to such a motor drive apparatus, the rotor position estimation is promptly stopped when the abnormality is detected. Hence, an event that the motor is caused to rotate, for example, by an abnormal current allowed to flow in the motor can be prevented.

In the above-mentioned motor drive apparatus, when the abnormality is detected, the discharge control unit may cause the motor current to flow in one direction at a current value at which the motor does not rotate or vibrate and at a predetermined switching frequency for the switching patterns other than the switching pattern for which the abnormality is detected.

According to such a motor drive apparatus, even when determination of the abnormality is performed, the discharge control of the capacitor can be performed within a range of the current at which the motor does not rotate or vibrate.

In the above-mentioned motor drive apparatus, the predetermined switching frequency may be configured within a range not less than a frequency in an audible range and not more than twice a minimum frequency in the audible range.

According to such a motor drive apparatus, noise in discharging can be reduced.

In the above-mentioned motor drive apparatus, the discharge control unit may stop discharge control when the discharge control is being performed and the motor current is not less than a preset threshold.

According to such a motor drive apparatus, the discharge is stopped when the motor current is not less than the preset threshold during the discharge control by the discharge control unit. Hence, even in case of an event that the capacitor is charged, for example, by a regeneration current of the motor flowing into the capacitor, the event can be detected in the early stage to stop the charging of the capacitor.

There is provided a discharge control method of a motor drive apparatus, according to a second aspect of the present invention, the method being applied to a motor drive apparatus including an inverter that converts DC power into three-phase AC power to be supplied to a motor and a capacitor provided on a power input side of the inverter, and being a discharge control method of the capacitor, the method comprising: a step of sequentially configuring, for each phase, a switching pattern in which a high voltage-side switching element for one phase of the inverter is turned ON, low voltage-side switching elements for the other two phases thereof are turned ON, and the other switching elements are turned OFF; a step of calculating a voltage pulse width at which the motor does not rotate or vibrate using a measurement value of a both-end voltage of the capacitor and an inductance estimation value of the motor, for the configured switching patterns; a step of applying a voltage with the calculated voltage pulse width to calculate an inductance, for each of the configured switching patterns; a step of estimating a rotor position using the inductances calculated for the respective switching patterns; and a step of causing a motor current to flow on the basis of the estimated rotor position to perform discharge of charge accumulated in the capacitor.

In the above-mentioned discharge control method of a motor drive apparatus, the both-end voltage of the capacitor and the inductance at the time of calculating the inductance for the switching pattern configured last time may be applied to the step of calculating the voltage pulse width for the switching pattern configured next.

In this way, the both-end voltage of the capacitor and the inductance for the switching pattern previous by one are applied to the step of calculating the voltage pulse width for the next switching pattern. Hence, the voltage pulse width can be calculated using the information further high in reliability.

Advantageous Effects of Invention

According to the present invention, an effect can be obtained that discharge of a capacitor using a motor can be performed without rotating the motor even when connected to a position sensorless motor.

DESCRIPTION OF EMBODIMENTS

Hereafter, an embodiment in the case where a motor drive apparatus of the present invention and a discharge control method of the same are applied to motor drive of an electric compressor of an in-vehicle air conditioner is described with reference to the drawings. Notably, the motor drive apparatus of the present invention and the discharge control method of the same are not limited to this application example but can be applied to drive of various motors.

Figure 1:
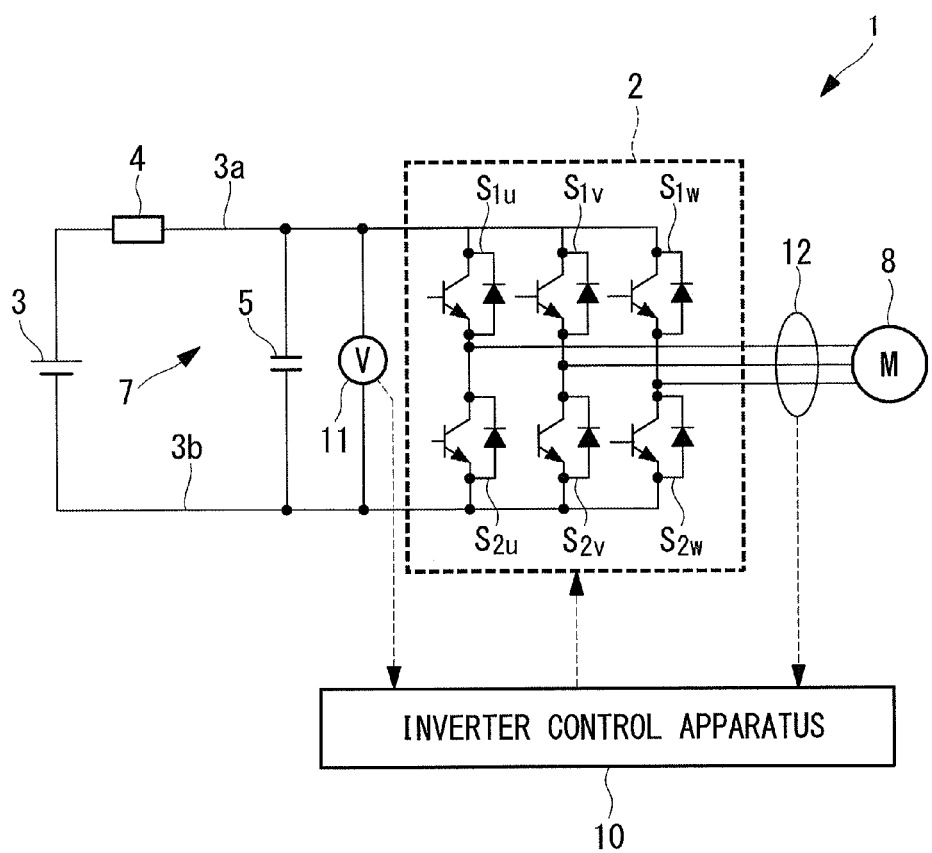
FIG. 1 is a diagram illustrating a schematic configuration of a motor drive apparatus according to an embodiment of the present invention.

FIG. 1 is a diagram illustrating a schematic configuration of a motor drive apparatus 1 according to the embodiment. In FIG. 1, an inverter 2 is connected to a DC power supply 3 through DC buses 3$a$ and 3$b$ for a P-electrode and an N-electrode. A coil 4 is connected to the DC bus 3$a$ for the P-electrode. A smoothing capacitor 5 is connected between the DC bus 3$a$ for the P-electrode and the DC bus 3$b$ for the N-electrode. The coil 4 and the smoothing capacitor 5 form a low pass filter 7.

The inverter 2 includes upper arm switching elements $S_{1u}$, $S_{1v}$ and $S_{1w}$ and lower arm switching elements $S_{2u}$, $S_{2v}$ and $S_{2w}$ provided correspondingly to respective phases. By these switching elements controlled by an inverter control apparatus (control apparatus) 10, three-phase AC power supplied to a motor 8 is generated from DC power. To the motor 8, an electric compressor (not shown) is connected as load.

A voltage sensor 11 for detecting a both-end voltage is provided at the smoothing capacitor 5. Moreover, a current sensor 12 for detecting a motor current is provided between the inverter 2 and the motor 8. Measurement values of the voltage sensor 11 and the current sensor 12 are outputted to the inverter control apparatus 10. While in FIG. 1, the current sensor 12 detects the current flowing in the motor 8, instead of this, the current sensor 12 may be provided on the DC bus 3b between the inverter 2 and the smoothing capacitor 5.

The inverter control apparatus 10 is, for example, an MPU (Micro Processing Unit) and has a computer-readable recording medium in which a program for executing processes described below is recorded. A CPU reads out and executes the program recorded in the recording medium into a main storage apparatus such as a RAM, and thereby, the processes below are realized. Examples of the computer-readable recording medium include, for example, a magnetic disk, a magneto-optical disk, a semiconductor memory and the like.

The inverter control apparatus 10 generates, for each phase, a gate drive signal with which a rotational speed of the motor 8 coincides with a motor speed command given from a higher control apparatus (not shown), gives the generated gate drive signal to the switching elements of the inverter 2 corresponding to each phase, and thereby, controls the inverter 2 to supply a desired three-phase AC current to the motor 8. Moreover, the inverter control apparatus 10 performs discharge control for discharging charge accumulated in the smoothing capacitor 5 at the time of stopping the motor.

Figures 2, 3:
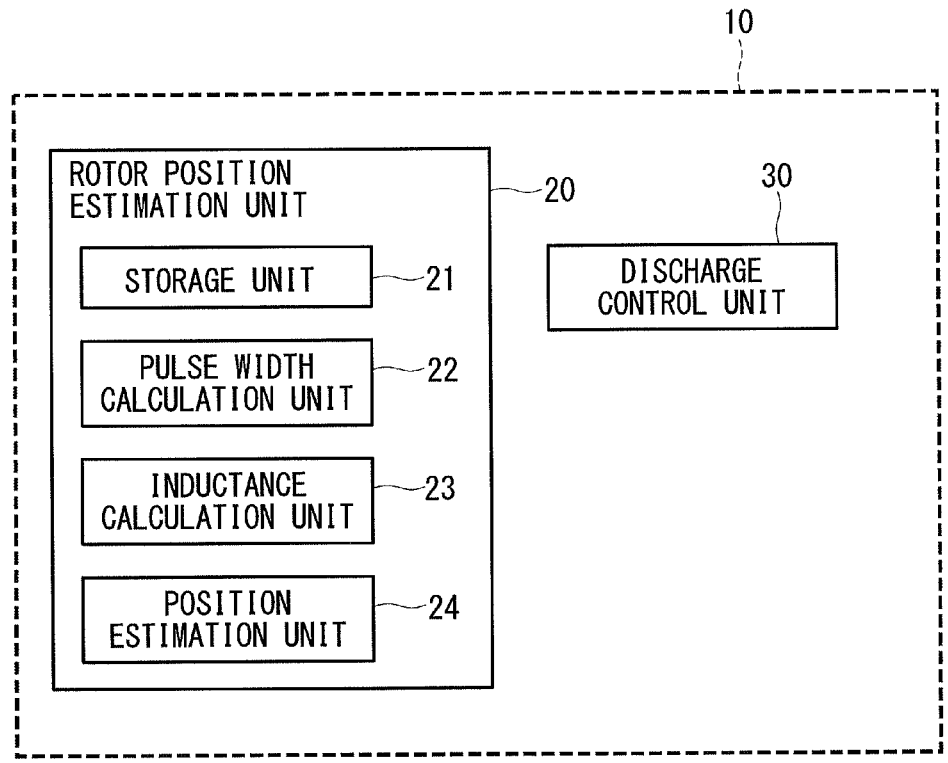
FIG. 2 is a diagram illustrating functional blocks illustrated by expanding functions regarding discharge of a smoothing capacitor out of various functions included in an inverter control apparatus.
FIG. 3 is a diagram illustrating switching patterns by way of example.

FIG. 2 illustrates functional blocks illustrated by expanding functions regarding discharge of the smoothing capacitor 5 out of various functions included in the inverter control apparatus 10. The inverter control apparatus 10 includes a position estimation unit 20 that performs rotor position estimation processing of estimating a rotor position, and a discharge control unit 30 that discharges charge accumulated in the smoothing capacitor 5 by controlling the inverter 2 on the basis of the estimated rotor position.

The rotor position estimation unit 20 includes, for a main configuration, a storage unit 21, a pulse width calculation unit 22, an inductance calculation unit 23 and a position estimation unit 24.

Three switching patterns of a first switching pattern, a second switching pattern and a third switching pattern are stored in the storage unit 21. Any of the first to third switching patterns is configured as a switching pattern for the phases in which pattern a high voltage-side switching element of the inverter 2 for one phase is turned ON, low voltage-side switching elements thereof for the other two phases are turned ON, and the other switching elements are turned OFF.

FIG. 3 is a diagram illustrating the switching patterns by way of example. As illustrated in FIG. 3, the first switching pattern turns ON the high voltage-side switching element $S_{1u}$ for the U-phase, turns ON the low voltage-side switching elements $S_{2v}$ and $S_{2w}$ for the V-phase and the W-phase, and turns OFF the other switching elements $S_{1v}$, $S_{1w}$ and $S_{2u}$. The second switching pattern turns ON the high voltage-side switching element $S_{1v}$ for the V-phase, turns ON the low voltage-side switching elements $S_{2w}$ and $S_{2u}$ for the W-phase and the U-phase, and turns OFF the other switching elements $S_{1w}$, $S_{1u}$ and $S_{2v}$. The third switching pattern turns ON the high voltage-side switching element $S_{1w}$ for the W-phase, turns ON the low voltage-side switching elements $S_{2u}$ and $S_{2v}$ for the U-phase and the V-phase, and turns OFF the other switching elements $S_{1u}$, $S_{1v}$ and $S_{2w}$.

Furthermore, in the storage unit 21, various initial values, comparison values and the like used in the rotor position estimation processing mentioned later are stored.

The pulse width calculation unit 22 calculates a pulse width of a voltage pulse applied to the motor 8 for detecting the rotor position, for each of the above-mentioned first to third switching patterns. For example, the pulse width is determined using a measurement value of the both-end voltage of the smoothing capacitor 5 and an inductance estimation value of the motor 8.

The inductance calculation unit 23 calculates an inductance using a motor current value at the time of applying a voltage with the voltage pulse width determined by the pulse width calculation unit 22, for each switching pattern.

The position estimation unit 24 estimates the rotor position using the inductances calculated for the respective first to third switching patterns.

Figure 4:
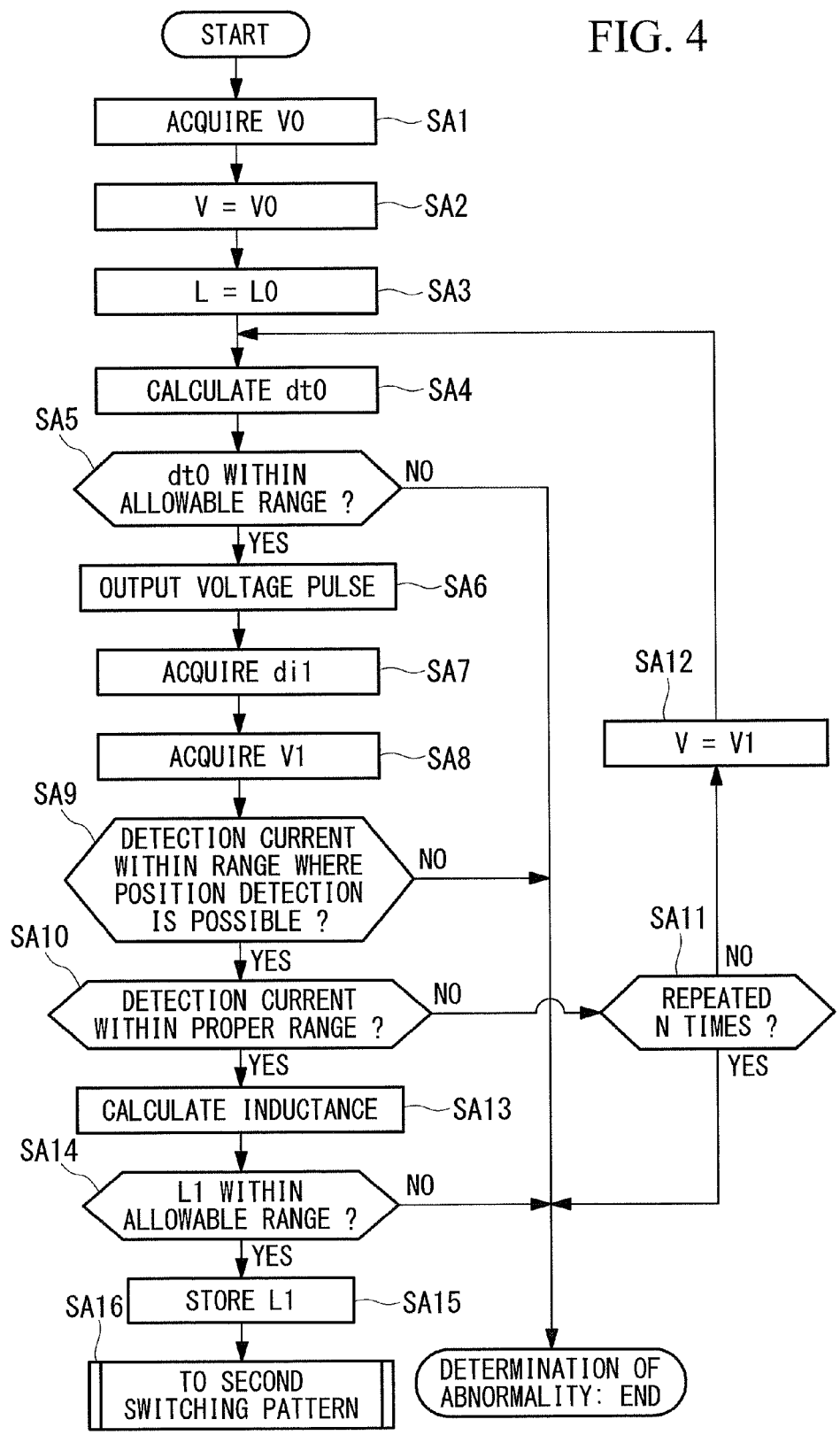
FIG. 4 is a flowchart illustrating a processing procedure of rotor position estimation processing performed by a rotor position estimation unit.

Next, a processing procedure of the rotor position estimation processing performed by the above-mentioned rotor position estimation unit 20 is described with reference to FIG. 4. Herein, while a case is exemplarily described where the inductances are sequentially calculated for the first to third switching patterns, respectively, and after that, rotor position estimation is performed using these inductance values, the processing procedure is not limited to this.

Here, the rotor position estimation processing is started in the case where it is detected that the connection between the DC power supply 3 and the smoothing capacitor 5 is shut or in the case where that situation is reported from a higher control apparatus (not shown) via a predetermined communication medium, after operation of the motor is stopped.

The above-mentioned detection of shutting the connection is performed, for example, by monitoring a main circuit voltage. Moreover, the above-mentioned communication medium by way of example may be wireless communication such as CAN (Controller Area Network)/LIN (Local Interconnect Network) or may be wired communication.

(Inductance Calculation Processing for First Switching Pattern)

First, a both-end voltage V0 of the capacitor is acquired from the voltage sensor 11 (step SA1). The acquired voltage V0 is set to a voltage V (step SA2). Next, a minimum value L0 of the motor inductance stored in the storage unit 21 is set to an inductance L (step SA3). Subsequently, a voltage pulse width is calculated using the voltage V, the inductance L, and a target current value di0 beforehand stored in the storage unit 21 (step SA4). Specifically, the voltage pulse width dt0 is calculated using expression (1) below.

$$dt0 = L/V \times di0 \quad (1)$$

Herein, an inverter output power voltage varies depending on an amount of charge accumulated in the smoothing capacitor 5 and an inductance value varies according to the rotor position. Moreover, since the inductance and the motor current are in inverse proportion relation to each other, for example, by configuring an initial value of the inductance to be a minimum value L0, the motor current thus flowing can be estimated at its maximum. Moreover, the target current value di0 is configured to be a predetermined value between an upper limit value and a lower limit value of a proper range mentioned later, for example, an intermediate value between the upper limit value and the lower limit value.

As above, an initial inductance L is configured to be the minimum value L0 and the target current value di0 to be the intermediate value within the proper range, and thereby, a probability can be increased in which the pulse width with which the motor current is brought within the proper range can be calculated.

Next, it is determined whether or not the voltage pulse width dt0 calculated in step SA4 falls within a preset allowable range (step SA5). Namely, it is determined whether or not the condition dt_min≤dt0≤dt_max is satisfied. When the result shows being out of the allowable range, determination of abnormality is performed to end the processing.

On the other hand, when in step SA5, it is determined that the voltage pulse width dt0 falls within the allowable range, the voltage with the voltage pulse width dt0 is outputted to the motor 8 in the first switching pattern (refer to FIG. 3) (step SA6). As a result, the current flows from the U-phase (+) to the V-phase (−) and the W-phase (−). The motor current in this stage is detected by the current sensor 12 (refer to FIG. 1) and this detection current di1 is inputted (step SA7). Moreover, the capacitor both-end voltage V1 after applying the voltage is detected by the voltage sensor 11 and this detection value is inputted (step SA8).

Figure 5:
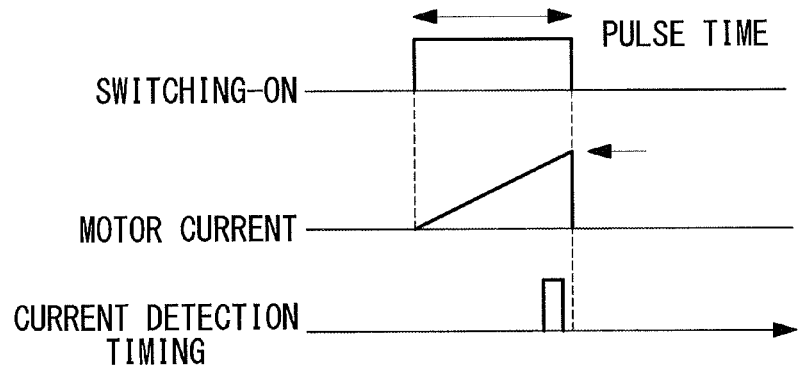
FIG. 5 is a diagram illustrating detection timing of a motor current by way of example.

Herein, it is preferable that the current sensor 12 detects the current immediately before a period during which the voltage pulse is being applied ends. This is because, as illustrated in FIG. 5, the current flows only during the period when the voltage pulse is being applied, and the motor current is zero during the period when the voltage pulse is not applied. Accordingly, it is supposed that the current sensor 12 is synchronous with the switching control of the inverter control apparatus 10 and detects the motor current in predetermined timing when the pulse time is about to end.

Next, it is determined whether or not the detection current di1 falls within a range where the position estimation is possible (step SA9). Specifically, it is determined whether or not the detection current di1 is larger than 0 and is not more than a preset first upper limit value dimax_1. Herein, the first upper limit value dimax_1 is a value configured in consideration of a predetermined margin for the maximum allowable current at which the motor does not rotate or vibrate.

As a result, when the detection current di1 is out of the range where the position estimation is possible, it is determined that the rotor position estimation is impossible, and the position estimation processing is ended.

On the other hand, when the detection current di1 falls within the range where the position estimation is possible, it is determined whether or not the detection current di1 falls within a proper range (step SA10). Herein, a lower limit value of the proper range is configured to be a value larger than the minimum value at which the position estimation is possible. An upper limit value thereof is configured to be not more than the first upper limit value dimax_1.

As a result, when the detection current di1 is out of the proper range ("NO" in step SA10), it is determined whether or not a repeat count exceeds a predetermined number of times (step SA11). When the result shows that the repeat count is not more than the predetermined number of times, V1 is set to the capacitor both-end voltage V (step SA12), the process returns to step SA4, the calculation of the voltage pulse width dt0 is reperformed.

By doing so, the reconfiguration of the voltage pulse width dt0 is to be repeated until the detection current dt1 within the proper range is obtained. Moreover, when the detection current di1 cannot be allowed to fall within the proper range even after the reconfiguration of the voltage pulse width is performed the predetermined number of times ("YES" in step SA11), the determination of abnormality is performed to end the rotor estimation processing.

On the other hand, when in step SA10, the detection current di1 falls within the proper range, an inductance L1 in the case of the first switching pattern is calculated using the capacitor both-end voltage V1 and the detection current di1 (step SA13). Specifically, the inductance L1 is calculated with expression (2) below.

$$L1 = V1 \times dt0/di1 \quad (2)$$

Herein, dt0 is the voltage pulse width calculated in step SA4. Moreover, the inductance L1 calculated here is a combined inductance of windings through which the current flows.

Subsequently, it is determined whether or not the inductance L1 falls within a preset allowable range (step SA14). When the result shows being out of the allowable range, it is determined that the rotor position estimation is impossible to end the position estimation processing. On the other hand, when the inductance L1 falls within the allowable range, the inductance L1 is stored in the storage unit 21 in association with the first switching pattern (step SA15).

Subsequently, L1 is set to the inductance L and V1 is set to the capacitor both-end voltage V, moving to next inductance calculation processing for the second switching pattern (step SA16). The inductance calculation processing for the second switching pattern is basically the same as the above-mentioned inductance calculation processing for the first switching pattern. It should be noted that, in the inductance calculation processing for the second switching pattern, steps SA1 to SA3 mentioned above are omitted and the calculation of the voltage pulse width in step SA4 is performed since V1 has been already set to the capacitor both-end voltage V and L1 to the inductance L.

Moreover, similarly, an inductance L2 and a capacitor both-end voltage V2 in the inductance calculation processing for the second switching pattern can be applied also to inductance calculation processing for the third switching pattern.

In this way, after the inductances L1, L2 and L3 are calculated in the inductance calculation processing for the first to third switching patterns, respectively, the position estimation unit 24 performs the rotor position estimation. Specifically, the rotor position is estimated from the inductances L1, L2 and L3 using beforehand prepared relation between the inductances and the rotor position. Notably, since such an estimation method of the rotor position is described in detail in Japanese Unexamined Patent Application, Publication No. 2001-136779, the description thereof is omitted here.

In this way, after the rotor position estimation processing of the rotor position estimation unit 20 is ended, capacitor discharge control of the discharge control unit 30 is performed.

Specifically, when the rotor estimation of the rotor position estimation unit 20 is normally performed, the discharge control unit 30 causes a discharge current to flow with respect to the winding in which torque hardly arises on the basis of the estimated rotor position. As a discharge technique after the rotor position is estimated, any known technique can be adopted.

For example, the control is performed such that the current is caused to flow only with respect to a component id for magnetization of the motor in which component the torque does not arise. Moreover, not only with respect to the component id for magnetization of the motor, but also with respect to a component iq for torque in which component the torque arises, the current may be randomly caused to flow for the discharge.

Moreover, as a specific example of the above-mentioned discharge technique, a technique in which the switching element corresponding to the winding in which the torque hardly arises is turned ON/OFF at a predetermined switching frequency, and thereby, the discharge current is intermittently caused to flow may be adopted. Here, although it can be considered that an alternating current, not a one-way current, is caused to flow with respect to the motor 8, the one-way current is preferable for the following reason.

Figure 6:
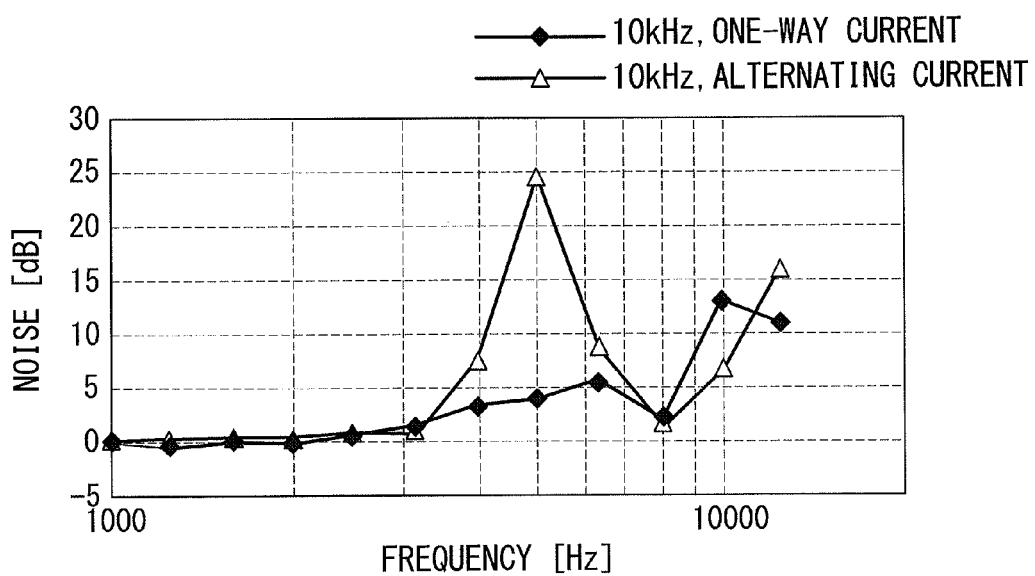
FIG. 6 is a diagram illustrating a relationship between a frequency (Hz) and noise (dB) in the case where the motor current is caused to flow at a switching frequency of 10 kHz.

Namely, when the switching is repeatedly performed at a predetermined frequency, noise arises from the inverter. FIG. 6 illustrates a relationship between the frequency (Hz) and the noise (dB) in the case where the motor current is caused to flow at a switching frequency of 10 kHz. In FIG. 6, the solid line designates the case where the current is caused to flow in one direction and the dotted line designates the case where the alternating current is caused to flow.

In the case of the current being in one direction, the peak of the noise arises in the vicinity of 10 kHz which is approximately the same as the switching frequency. On the contrary, in the case of the current alternating, the peak of the noise arises at 5 kHz which is a half of the switching frequency. Accordingly, in the case of the alternating current, the noise is difficult to be reduced unless the frequency corresponding to a half of the switching frequency is not less than the audible range. However, since the higher the frequency is increased, the shorter the processing period becomes, burden on the operations in the control apparatus is unpreferably increased.

On the contrary, in the case of the one-way current, the frequency is configured to be not less than the audible range, and thereby, the noise can be readily reduced.

In view of the above, in the embodiment, a frequency not less than the audible range, in addition to being a small frequency to as more an extent as possible, is configured as the switching frequency to cause the motor current in the range where the motor does not rotate or vibrate to flow in the motor. Thereby, the discharge of the smoothing capacitor 5 is performed. Specifically, the motor current is limited to be not more than a value at which the torque not more than the total of the friction force and the cogging torque of the motor arises. Here, a theoretical expression of a motor torque T is given as expression (3) below.

$$T = p(Ld - Lq)Id \times Iq + p \times \phi \times Iq \quad (3)$$

In expression (3), p is the number of pole pairs of the motor, Ld is a d-axis inductance of the motor, Lq is a q-axis inductance of the motor, Id is a d-axis current, Iq is a q-axis current, and φ is a magnetic flux of the motor.

Here, the motor current is caused to flow such that a torque T' which arises from the current caused to flow in the motor is smaller than a value having the torque T obtained from the above-mentioned theoretical expression multiplied by a safety factor α (0<α≤1), that is, such that expression (4) below is satisfied.

$$T' < T \times \alpha \quad (4)$$

Notably, when suppression of occurrence of the torque is focused on rather than the noise, to cause the alternating current to flow is rather preferable.

On the other hand, when the above-mentioned rotor position estimation unit 20 performs the determination of abnormality (for example, its cause is short circuit inside one phase, short circuit between phases, line breakage, or the like by way of example), and therefore, the rotor position cannot be estimated, the charge accumulated in the smoothing capacitor 5 is discharged by causing the motor current not more than the current value at which the motor rotates and vibrates to flow between the phases in which the abnormality does not arise, for example, in the switching pattern for which the calculation of the inductance is normally performed. For example, in the above-mentioned flow, although the rotor position estimation processing is ended at the time point when the determination of abnormality is performed, instead of this, the calculation of the inductances for the other switching patterns may be performed even when the determination of abnormality is performed.

In this case, for example, it can be considered that the current is intermittently caused to flow with respect to a predetermined winding by switching a predetermined switching element at a predetermined frequency. In this case, as mentioned above, preferably, when the viewpoint of the noise is focused on, the current in one direction is caused to flow, or when the suppression of the torque is focused on, the alternating current is done.

As above, according to the motor drive apparatus and the discharge control method of the same according to the embodiment, the pulse voltage width in the range where the motor does not rotate or vibrate is beforehand obtained by operations. The voltage is applied with this pulse width. The inductance is calculated on the basis of the motor current and the capacitor both-end voltage at that time. The rotor position is estimated using this inductance. By doing so, the rotor position can be estimated without rotating or vibrating the motor. As a result, the position of the windings for which the motor hardly rotates can be specified. The current is caused to flow with respect to that position of the windings, and thereby, the charge accumulated in the smoothing capacitor can be quickly discharged. Moreover, the discharge current is caused to flow in one direction, and furthermore, the switching frequency is configured to be a small frequency in the audible range to as more an extent as possible. Thereby, the noise can be reduced.

Furthermore, even when the determination of abnormality is performed, the discharge control of the smoothing capacitor 5 can be performed within the current range where the motor does not rotate or vibrate.

Notably, in the motor drive apparatus and the discharge control method of the same according to the embodiment, there is a possibility in which the motor 8 rotates by negative pressure of a coolant of the electric compressor connected to the motor 8 when the discharge control of the smoothing capacitor 5 is performed. Under such a situation, performing the discharge control of the smoothing capacitor 5 can result in the regeneration current of the motor 8 flowing into the smoothing capacitor 5 and the smoothing capacitor 5 is charged, depending on counter electromotive force with rotation of the motor 8 and switching status of the discharge control.

Figure 7:
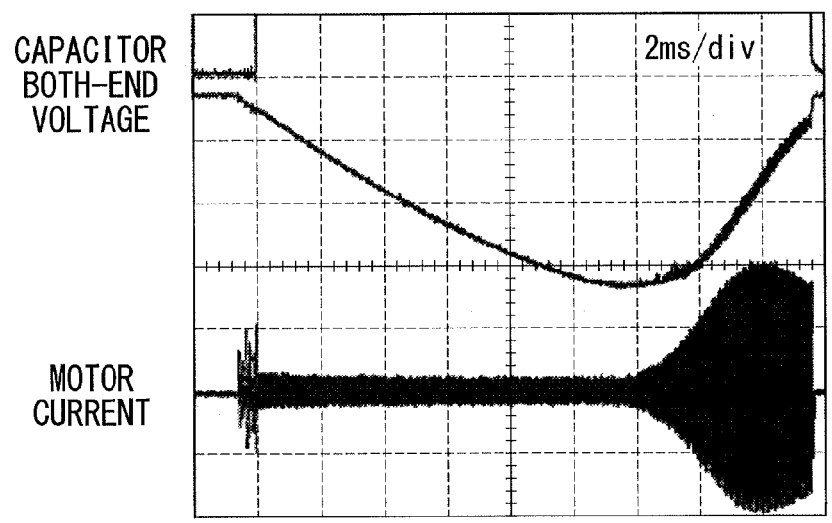
FIG. 7 is a diagram illustrating by way of example a relationship between a capacitor both-end voltage and the motor current at the time when the smoothing capacitor is charged by a regeneration current of a motor during a period when discharge control is being performed.

FIG. 7 illustrates one example of a relationship between the capacitor both-end voltage and the motor current at the time when the smoothing capacitor 5 is charged by regeneration current of the motor 8 during the period of performing the discharge control. It is apparent from FIG. 7 that, upon starting of regeneration in the motor 8, the smoothing capacitor 5 is charged up to the state before the discharge for approximately 6 ms.

Accordingly, it is needed that such charging of the smoothing capacitor 5 by the regeneration current of the motor 8 is detected in the early stage to stop the charging of the smoothing capacitor 5.

As measures for preventing the above-mentioned charging of the smoothing capacitor 5 by the above regeneration current, for example, a method can be considered in which the discharge control of the discharge control unit 30 is stopped when it is detected that the detection value of the voltage sensor 11 is elevated not less than a preset specified value. However, there is a case where, for the voltage sensor 11, a filter having a relatively large time constant (for example, 200 ms) is used for removing noise in switching. In this case, the detection speed does not follow the capacitor both-end voltage, and therefore, the voltage elevation which arises for approximately 6 ms as illustrated in FIG. 7 cannot be handled.

Figure 8:
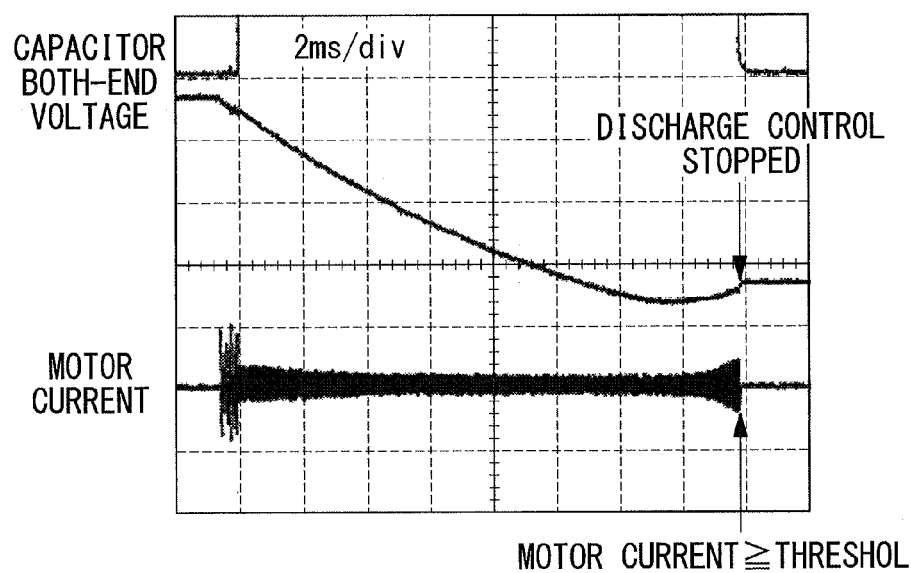
FIG. 8 is a diagram illustrating by way of example a relationship between the capacitor both-end voltage and the motor current in the case where the discharge control is stopped on the basis of the motor current.

On the contrary, the measurement of the motor current by the current sensor 12 is performed at a time interval (for example, approximately 50 μs) at which the charging speed of the smoothing capacitor 5 is sufficiently handled. Hence, the charging of the smoothing capacitor 5 can be detected in the sufficiently early stage. When it is detected that the motor current (measurement value of the current sensor 12) is not less than a predetermined threshold during the period when the discharge control of the discharge control unit 30 is being performed, the discharge control of the discharge control unit 30, that is, switching is stopped to allow all of the switching elements $S_{1u}$, $S_{1v}$, $S_{1w}$, $S_{2u}$, $S_{2v}$ and $S_{2w}$ to be in open states, and thereby, the regeneration current of the motor 8 is prevented from flowing into the smoothing capacitor 5. By doing so, as illustrated in FIG. 8, the charging of the smoothing capacitor 5 can be stopped and the charging of the smoothing capacitor 5 as illustrated in FIG. 7 can be prevented. Moreover, it is supposed that the charge in the smoothing capacitor 5 is discharged, for example, in a manner of free discharge after the discharge control unit 30 stops the discharge control.

Figure 9:
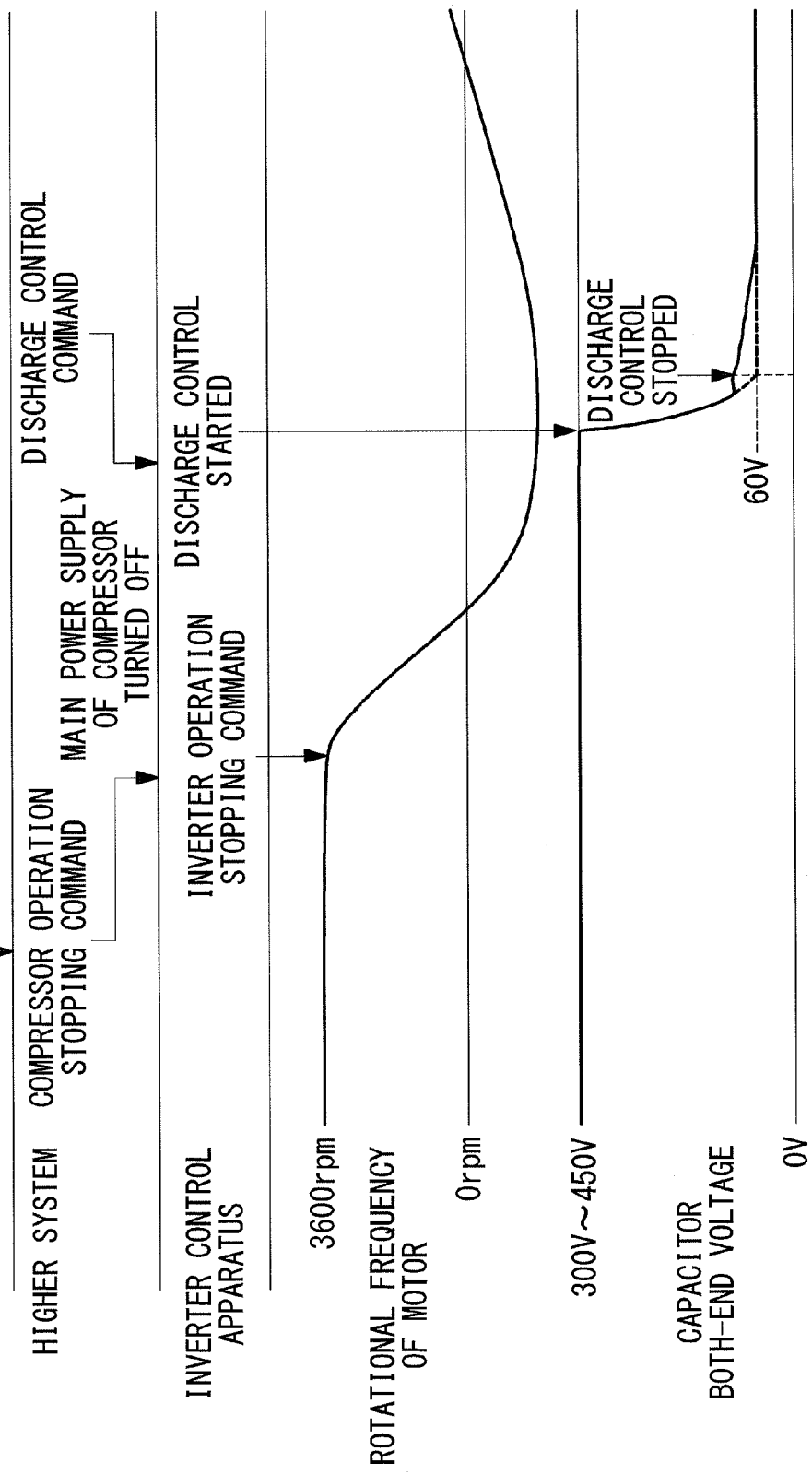
FIG. 9 is a timing chart schematically illustrating operations of individual portions from stopping of operation of a vehicle to ending of the discharge control.

FIG. 9 is a timing chart schematically illustrating operations of the individual portions from stopping of the operation of the vehicle to ending of the discharge control.

As illustrated in FIG. 9, when the driver turns OFF the key, the higher system outputs a command of stopping the operation of the electric compressor, and the main power supply of the compressor is turned OFF by a predetermined time delay. Upon reception of the command of stopping the operation of the compressor from the higher system, the inverter control apparatus 10 stops the operation of the inverter 2. Thus, the number of revolutions of the motor 8 gradually decreases. Subsequently, when satisfying predetermined conditions allows a discharge control command to be outputted from the higher system to the inverter control apparatus 10, the inverter control apparatus 10 starts the control regarding the discharge of the smoothing capacitor 5. Thereby, the rotor position of the motor 8 is estimated and the discharge control based on the estimated rotor position is performed by the discharge control unit 30. By doing so, the current of the capacitor 5 is caused to flow in the motor 8 via the predetermined switching elements to reduce the capacitor both-end voltage. In this stage, if the regeneration current of the motor 8 as mentioned above does not arise, as indicated by the dotted line in FIG. 9, the capacitor both-end voltage is to gradually decrease and the discharge control is to be stopped upon its decrease down to a predetermined voltage (here, 60 V). Nevertheless, in the case where the regeneration current flows into the smoothing capacitor 5 by the reverse rotation of the motor 8, as indicated by the solid line in FIG. 9, the capacitor both-end voltage is reversed in the direction of charging. Then, this is detected when the motor current becomes not less than the predetermined threshold, and the discharge control unit 30 stops the discharge control to maintain all of the switching elements in the open states. After that, the free discharge moderately reduces the capacitor both-end voltage.

As above, the discharge by the discharge control unit 30 is stopped when the discharge control unit 30 is performing the discharge control and the motor current is not less than the preset threshold. Therefore, even in the case of an event that the smoothing capacitor 5 is charged, for example, by the regeneration current of the motor 8 flowing into the smoothing capacitor 5, the event can be detected in the early stage to stop the charging of the smoothing capacitor 5.

REFERENCE SIGNS LIST

1 Motor drive apparatus
2 Inverter
3 DC power supply
3a and 3b DC buses
5 Smoothing capacitor
8 Motor
10 Inverter control apparatus
11 Voltage sensor
12 Current sensor
20 Rotor position estimation unit
21 Storage unit
22 Pulse width calculation unit
23 Inductance calculation unit
24 Position estimation unit
30 Discharge control unit
$S_{1u}$, $S_{1v}$, $S_{1w}$, $S_{2u}$, $S_{2v}$ and $S_{2w}$ Switching elements

The invention claimed is:

1. A motor drive apparatus comprising:
an inverter that converts DC power into three-phase AC power to be supplied to a motor;
a capacitor provided on an input side of the inverter;
a control apparatus that controls the inverter; and
a current sensor that detects a motor current, wherein
the control apparatus includes
a rotor position estimation unit that estimates a rotor position of the motor after operation of the motor is stopped, and
a discharge control unit that discharges charge accumulated in the capacitor on the basis of the estimated rotor position, and
the rotor position estimation unit includes
a pulse width calculation unit that calculates a voltage pulse width at which the motor does not rotate or vibrate using a measurement value of a both-end voltage of the capacitor and an inductance estimation value of the motor, for each of three preset switching patterns,
an inductance calculation unit that applies a voltage with the voltage pulse width calculated by the pulse width calculation unit to calculate an inductance, for each of the switching patterns, and
a position estimation unit that estimates the rotor position using the inductances for the respective switching patterns calculated by the inductance calculation unit.

2. The motor drive apparatus according to claim 1, wherein
the pulse width calculation unit repeatedly calculates the voltage pulse width until the motor current at the time of applying the voltage with the pulse width which is determined falls within a preset proper range, for each of the switching patterns, and
the inductance calculation unit calculates the inductance using the measurement value of the both-end voltage of the capacitor and a measurement value of the motor current at the time when the motor current falls within the proper range.

3. The motor drive apparatus according to claim 1, wherein
the discharge control unit causes the motor current to flow in one direction by switching a switching element determined on the basis of the rotor position estimated by the position estimation unit at a predetermined switching frequency, and the predetermined switching frequency is configured within a range not less than a frequency in an audible range and not more than twice a minimum frequency in the audible range.

4. The motor drive apparatus according to any of claim 1, wherein
the rotor position estimation unit does not perform rotor position estimation, regarding a case as detection of abnormality, in the case where the motor current is zero or the motor current exceeds a first upper limit value determined on the basis of a maximum allowable current at which the motor does not rotate or vibrate for any of the switching patterns.

5. The motor drive apparatus according to any of claim 4, wherein
rotor position estimation is not performed, regarding a case as detection of abnormality, in the case where the inductance calculated by the inductance calculation unit is out of a preset allowable range.

6. The motor drive apparatus according to claim 4, wherein when the abnormality is detected, the discharge control unit causes the motor current to flow in one direction at a current value at which the motor does not rotate or vibrate and at a predetermined switching frequency for the switching patterns other than the switching pattern for which the abnormality is detected.

7. The motor drive apparatus according to claim 6, wherein the predetermined switching frequency is configured within a range not less than a frequency in an audible range and not more than twice a minimum frequency in the audible range.

8. The motor drive apparatus according to any of claim 1, wherein
the discharge control unit stops discharge control when the discharge control is being performed and the motor current is not less than a preset threshold.

9. A discharge control method of a motor drive apparatus, the method being applied to a motor drive apparatus including an inverter that converts DC power into three-phase AC power to be supplied to a motor and a capacitor provided on a power input side of the inverter, and being a discharge control method of the capacitor, the method comprising:
a step of sequentially configuring, for each phase, a switching pattern in which a high voltage-side switching element for one phase of the inverter is turned ON, low voltage-side switching elements for the other two phases thereof are turned ON, and the other switching elements are turned OFF;
a step of calculating a voltage pulse width with which the motor does not rotate or vibrate using a measurement value of a both-end voltage of the capacitor and an inductance estimation value of the motor, for the configured switching patterns;
a step of applying a voltage with the calculated voltage pulse width to calculate an inductance, for each of the configured switching patterns;
a step of estimating a rotor position using the inductances calculated for the respective switching patterns; and
a step of causing a motor current to flow on the basis of the estimated rotor position to perform discharge of charge accumulated in the capacitor.

10. The discharge control method of a motor drive apparatus according to claim 9, wherein
the both-end voltage of the capacitor and the inductance at the time of calculating the inductance for the switching pattern configured last time are applied to the step of calculating the voltage pulse width for the switching pattern configured next.

* * * * *